Nov. 25, 1941.    E. P. DAVEY    2,263,761

PHOTOGRAPHIC EMULSION

Filed July 11, 1939

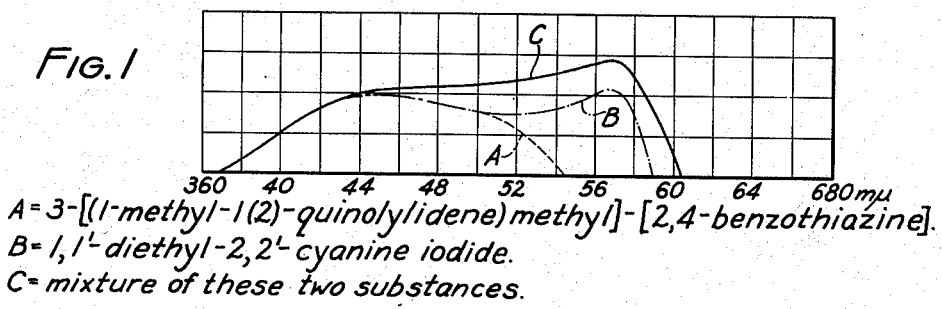

FIG. 1

A = 3-[(1'-methyl-1(2)-quinolylidene)methyl]-[2,4-benzothiazine].
B = 1,1'-diethyl-2,2'-cyanine iodide.
C = mixture of these two substances.

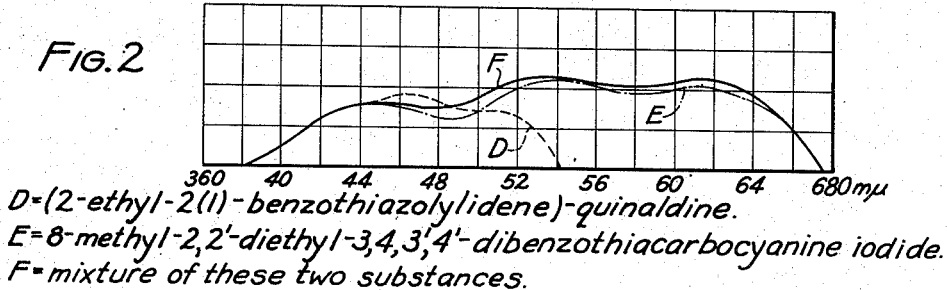

FIG. 2

D = (2-ethyl-2(1)-benzothiazolylidene)-quinaldine.
E = 8-methyl-2,2'-diethyl-3,4,3',4'-dibenzothiacarbocyanine iodide.
F = mixture of these two substances.

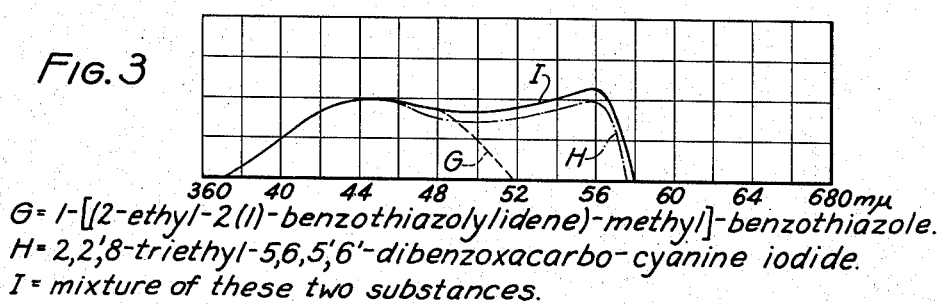

FIG. 3

G = 1-[(2-ethyl-2(1)-benzothiazolylidene)-methyl]-benzothiazole.
H = 2,2',8-triethyl-5,6,5',6'-dibenzoxacarbo-cyanine iodide.
I = mixture of these two substances.

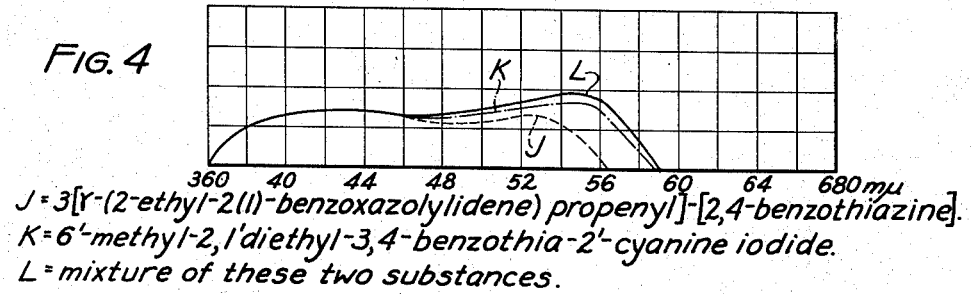

FIG. 4

J = 3[γ-(2-ethyl-2(1)-benzoxazolylidene)propenyl]-[2,4-benzothiazine].
K = 6'-methyl-2,1'diethyl-3,4-benzothia-2'-cyanine iodide.
L = mixture of these two substances.

EDWARD P. DAVEY
INVENTOR

BY
ATTORNEYS

Patented Nov. 25, 1941

2,263,761

UNITED STATES PATENT OFFICE 2,263,761

PHOTOGRAPHIC EMULSION

Edward P. Davey, Wealdstone, England, assignor to Eastman Kodak Company, Rochester, N. Y., a corporation of New Jersey Application July 11, 1939, Serial No. 283,850

14 Claims. (Cl. 95—7)

This invention relates to photographic emulsions and more particularly to sensitized photographic emulsions of the silver halide type.

It is known in the art of making photographic emulsions that certain dyes of the cyanine class alter the sensitivity of photographic emulsions of the gelatino-silver-halide kind, when incorporated in the emulsions. It is also known that the sensitization produced by a given dye varies somewhat with the type of emulsion in which the dye is incorporated. Furthermore, the sensitization of a given emulsion by a given dye may be altered by varying conditions in the emulsion. For example, the sensitization may be increased by increasing the silver ion concentration or by decreasing the hydrogen ion concentration (i. e. increasing the alkalinity) or both. Thus, sensitization can be increased by bathing plates, coated with a sensitized emulsion, in water or in aqueous solution of ammonia. Such processes of altering the sensitivity of a sensitized emulsion by increasing the silver ion concentration and/or by decreasing the hydrogen ion concentration is commonly called "hypersensitization." Hypersensitized emulsions generally have poor keeping qualities.

More recently, it has been found that the sensitization produced in an emulsion by certain cyanine dyes can be increased by incorporating, in the sensitized emulsion, certain other cyanine dyes. Inasmuch as conditions in the emulsion, i. e. the silver ion and/or the hydrogen ion concentration, undergo little or no change in such a method, the phenomenon has been called "supersensitization." Certain supersensitizing combinations of dyes have been described in United States Patents 2,075,046, 2,075,047 and 2,075,048, each dated March 30, 1937.

I have now found a new means of altering the sensitivity produced in emulsions by certain cyanine dyes. Inasmuch as the conditions in the emulsions, i. e. the hydrogen ion and/or the silver ion concentration, undergo little or no change in my new method, I shall designate my new method as a kind of supersensitization. However, my new method is not to be confused with that described in the foregoing patents, because instead of employing combinations of two or more sensitizing cyanine dyes, I employ combinations of sensitizing cyanine dyes with substances which, in themselves, have, at best, but a moderate and often a weak or no spectral (optical) sensitizing action on the emulsions. These substances which have, in themselves, a moderate to no spectral sensitizing action are simple cyanine dye bases and carbocyanine dye bases. The dye bases can be referred to as the supersentizing substances.

An object of my invention, therefore, is to provide supersensitized photographic emulsions. A further object is to provide a process for preparing supersensitized photographic emulsions. A further object is to provide a process for increasing the sensitivity of spectrally sensitized photographic emulsions. A further object is to provide a photographic element comprising a supersensitized emulsion. Other objects will become apparent hereinafter.

I have found that the aforesaid simple cyanine dye bases supersensitize sensitizing dyes from the 2,2'-cyanine class, the thia-2'-cyanine class, the 3,4-benzothia-2'-cyanine class, the 3,4-benzoxa-2'-cyanine class, the 2,2'-carbocyanine class, the oxacarbocyanine class, the dibenzoxacarbocyanine class, the 8-alkyl dibenzoxacarbocyanine class, and the 8-alkylthia- and 8-alkyldibenzothiacarbocyanine classes. On the other hand, the carbocyanine dye bases supersensitize sensitizing dyes from only the 2,2'-cyanine class and the 3,4-benzothia-2'-cyanine class.

While there is more than one manner of formulating and naming the cyanine dye bases and the cyanine dyes which I employ in practicing my invention, it is believed that the following names, formulas and systems of numbering are in accordance with those employed during the development of the art to its present stage.

Among the simple cyanine dye bases especially useful in practicing my inventions are the following:

The (1-alkyl-1(2)-quinolylidene)-quinaldines which can be represented by the following general formula:

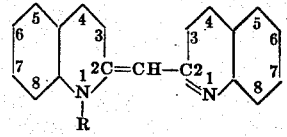

The [4-alkyl-4(3)-(2,4-benzothiazinylidene)]- quinaldines which can be represented by the following general formula:

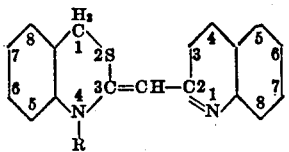

The 3-[(1-alkyl-1(2)-quinolylidene)methyl]-[2,4-benzothiaines] which can be represented by the following general formula:

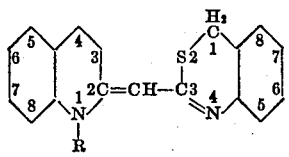

The (2-alkyl-2(1)-benzothiazolyldine)-quinaldines which can be represented by the following general formula:

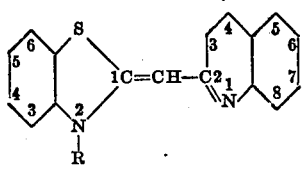

The 2-[(1-alkyl-1(2)-quinolylidene)methyl]-β-naphthothiazoles which can be represented by the following general formula:

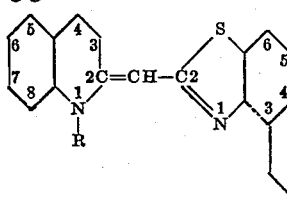

The 1 - [(2 - alkyl - 2(1) - benzothiazolylidene) methyl]-benzothiazoles which can be represented by the following general formula:

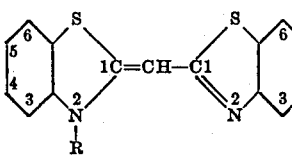

The 1 - [(2 - alkyl - 2(1) - benzothiazolylidene) methyl]-[2,4-benzothiazines] which can be represented by the following general formula:

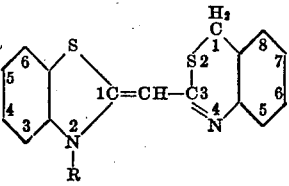

The 3-[(1-alkyl-1(2)-β-naphthothiazolylidene) methyl]-[2,4-benzothiazines] which can be represented by the following general formula:

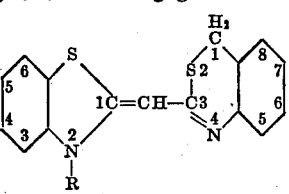

The 3 - [(4 - alkyl - 4(3) -{2,4-benzothiazinylidene}) methyl]-[2,4-benzothiazines] which can be represented by the following general formula:

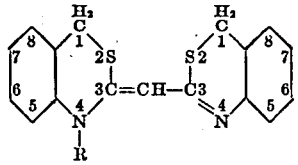

In the above general formulas, R represents an alkyl group. Those simple cyanine dye bases wherein R represents an alkyl group of the formula $C_nH_{2n+1}$ wherein $n$ represents a positive integer of from one to four, are advantageously employed in practicing my invention.

Among the carbocyanine dye bases especially useful in practicing my invention are the following:

The 1-[γ-(2-alkyl-2(1)-benzothiazolylidene)-propenyl]-benzothiazoles which can be represented by the following general formula:

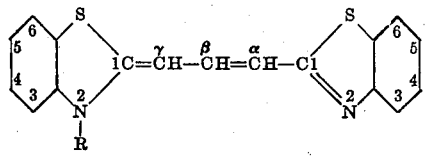

The 1-[γ-(4-alkyl-4(3)-{2,4-benzothiazinylidene})propenyl]-benzothiazoles which can be represented by the following general formula:

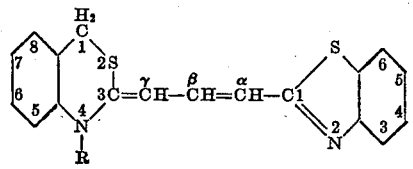

The 2-[γ-(4-alkyl-4(3)-{2,4-benzothiazinylidene})propenyl]-[β-naphthothiazoles] which can be represented by the following general formula:

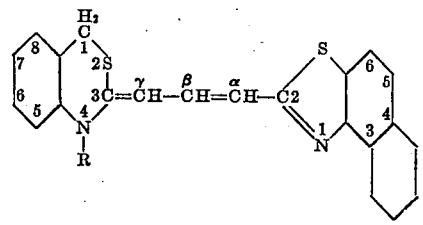

The 1-[γ-(4-alkyl-4(3)-{2,4-benzothiazinylidene})propenyl]-benzoxazoles which can be represented by the following general formula:

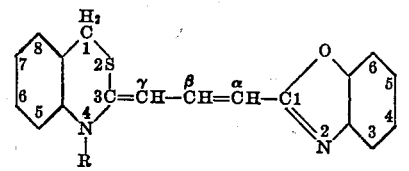

The 3 - [γ -(2 - alkyl-2(1) -{α-naphthoxazolyidene})propenyl]-[2,4-benzothiazines] which can be represented by the following general formula:

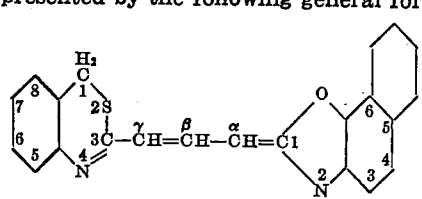

The 3 - [γ -(2 - alkyl - 2(1) - benzoselenazolylidene) propenyl]-[2,4-benzothiazines] which can be represented by the following general formula:

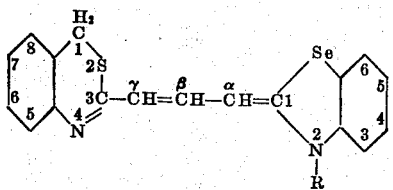

In the above general formulas of carbocyanine dye bases, R represents an alkyl group. Those carbocyanine dye bases in which R represents an alkyl group of the formula $C_nH_{2n+1}$ wherein $n$ represents a positive integer of from one to four are advantageously employed in practicing my invention.

The supersensitizing action of the simple cyanine dye bases and the carbocyanine dye bases is in no manner proportional to the sensitizing action which the bases exert in themselves, in photographic emulsions, as these bases which, in themselves, exert no sensitizing action are often strong supersensitizers.

2,2'-cyanine dyes can be represented by the following general formula:

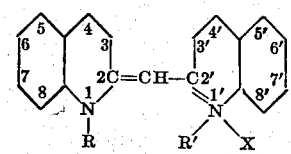

Thia-2'-cyanine dyes can be represented by the following general formula:

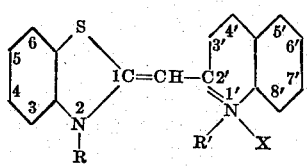

3,4-benzothia-2'-cyanine dyes can be represented by the following general formula:

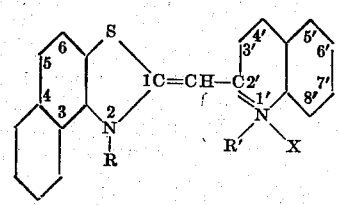

3,4-benzoxa-2'-cyanine dyes can be represented by the following general formula:

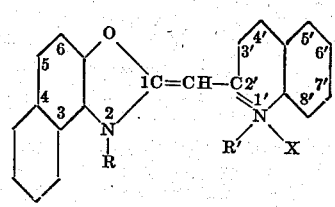

In the above formulas of cyanine dyes, R and R' represent alkyl groups and X represents an acid radical. I have ordinarily found it convenient to employ the dye-iodides (wherein X represents iodide), although chlorides, bromides or other dye-salts can be employed. Those cyanine dyes formulated above wherein R and R' represent alkyl groups of one to four carbon atoms (especially those of the formula $C_nH_{2n+1}$ wherein $n$ represents a positive integer of from one to four) are advantageously employed in practicing my invention. The nuclei of the above dyes may carry simple substituents which do not interfere with sensitizing properties, such as alkyl, chloro or alkoxy groups for example.

The 2,2'-carbocyanine dyes can be represented by the following general formula:

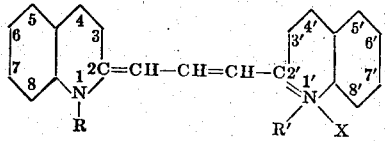

The oxacarbocyanine dyes can be represented by the following general formula:

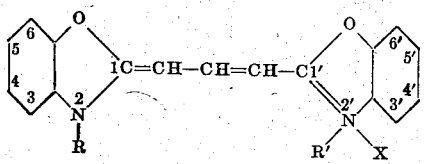

The dibenzoxacarbocyanine dyes can be represented by the following general formula:

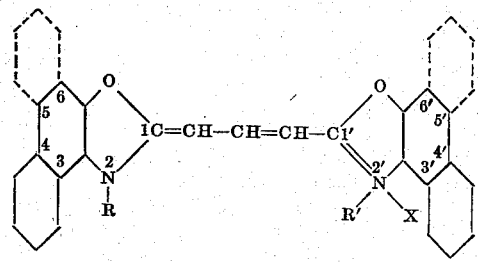

The 8-alkythiacarbocyanine dyes can be represented by the following general formula:

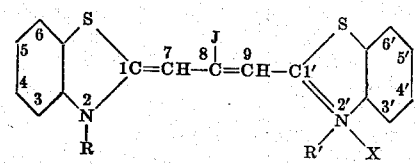

The 8-alkyldibenzoxa- and 8-alkyldibenzothiacarbocyanine dyes can be represented by the following general formula:

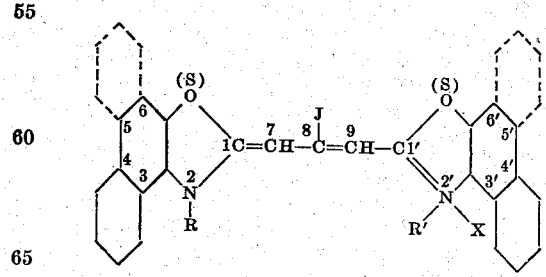

In the above formulas of carbocyanine dyes, J, R and R' represent alkyl groups and X represents an acid radical. I have ordinarily found it convenient to employ the dye-iodides (wherein X represents iodide), although chlorides, bromides or other dye-salts can be employed. Those carbocyanine dyes wherein R and R' represent alkyl groups of from one to four carbon atoms (especially alkyl groups of the formula $C_nH_{2n+1}$ wherein $n$ represents a positive integer of from one to four), are advantageously employed in practicing my invention. Those 8-alkylcarbocyanines wherein J represents an alkyl group of from one to two carbon atoms are advantageously employed in practicing my invention. The nuclei of the above carbocyanine dyes may carry simple substituents which do not interfere with sensitizing properties, such as alkyl, chloro or alkoxy groups for example.

According to my invention, I incorporate one or more of sensitizing 2'-cyanine, carbocyanine (or 8-alkylcarbocyanine) dyes, together with one or more of the cyanine or carbocyanine dye bases. My invention is particularly directed to the ordinarily employed gelatino-silver-halide emulsions. However, my supersensitizing combinations can be employed in emulsions in which the carrier is other than gelatin, for example, a resinous substance or cellulosic derivative which has substantially no deleterious effect on the light-sensitive materials. As silver halide emulsions, we include such emulsions as are commonly employed in the art, but more particularly the customarily employed silver chloride and silver bromide emulsions. The silver chloride and silver bromide emulsions may contain silver iodide. By way of illustration the herein described supersensitized emulsions were prepared employing an ordinary gelatino-silver-bromide emulsion (containing a small amount of silver iodide) of ordinary concentration (approximately 40 g. of silver halide per liter of emulsion).

The sensitizing dyes and the dye bases can be employed in various concentrations, depending upon the effects desired. In preparing my supersensitized emulsions, I have found that for the ordinary gelatino-silver-bromide emulsions, the concentrations of the individual sensitizing dyes is ordinarily advantageously within the range, 10 to 30 mg. of the dye per liter of emulsion.

With extremely fine-grain emulsions (which includes most of the ordinarily employed silver chloride emulsions), the ratio of concentration of sensitizing dye to the concentration of silver halide in the emulsion is advantageously larger than in the coarser grain emulsions, where smaller amounts of the sensitizing dyes usually give optimum sensitization.

The concentration of the dye bases is advantageously within about the same range as that set forth for the sensitizing dyes. Certain of the dye bases may show an undesirable tendency to cause fog and where this is the case, the concentration of the dye base is advantageously reduced to about one-fifth that of the sensitizing dye. The dye bases also have a tendency to reduce blue sensitivity of the emulsions.

It is, of course, well known in the art that the sensitivity conferred upon an emulsion by a sensitizing dye (or dyes) does not increase proportionately to the concentration of the dye (or dyes) in the emulsion, but passes through a maximum as the concentration is increased. Likewise, the sensitivity conferred upon emulsions by my new supersensitizing combinations passes through a maximum as concentration is increased. In determining the optimum concentration for any of my new supersensitizing combinations, it is advisable to begin with a supersensitizing combination in which the sensitizing dye is at somewhat less than its optimum concentration, since the optimum concentration of the sensitizing dye alone does not necessarily correspond to its optimum concentration in the supersensitizing combination.

The optimum concentration of a sensitizing dye (i. e. the concentration at which greatest sensitivity occurs) can be readily determined in a manner well known to those skilled in the art by measuring the sensitivity of a series of emulsions containing different concentrations of the sensitizing dye. The optimum concentration of any of my new supersensitizing combinations, can, of course, be determined similarly, by measuring the sensitivity of a series of emulsions containing different concentrations of the sensitizing dye in combination with a dye base.

The methods of incorporating sensitizing dyes in emulsions are simple and well known to those skilled in the art. In practicing my invention, the sensitizing dyes can be incorporated in the emulsions separately or together with the supersensitizing substances, i. e. the dye bases. It is convenient to first add the dyes in the form of solutions in appropriate solvents. Then the supersensitizing substances can be added, advantageously in the form of a solution. The solvents employed must, of course, be compatible with the emulsions and substantially free from any deleterious effect on the light-sensitive materials in the emulsions. Methanol has proven satisfactory as a solvent for both the dyes and the dye bases, in practicing my invention. The dyes and dye bases are advantageously incorporated in the finished, washed emulsion and should be uniformly distributed throughout the emulsions. The following procedure is satisfactory: Stock solutions of the sensitizing dye and the dye base are prepared by dissolving the sensitizing dye and the dye base in a suitable solvent, such as methyl or ethyl alcohol or acetone for example. Then, to one liter of a flowable gelatino-silver-halide emulsion, an amount of the so-prepared stock solution of sensitizing dye (diluted somewhat with water, if desired) is slowly added, while stirring the emulsion. Stirring is continued until the sensitizing dye is thoroughly incorporated in the emulsion. Then, an amount of the stock solution of dye base (diluted somewhat with water, if desired) is slowly added, while stirring the emulsion. Stirring is continued until the dye base is thoroughly incorporated. The supersensitized emulsion can then be coated out on a suitable support, such as a glass plate, cellulose derivative film, resinous material film or paper, to a suitable thickness and allowed to dry. The details of such coating methods are well known to those skilled in the art.

The amount of sensitizing dye and dye base actually incorporated in the emulsion will, of course, vary from dye to dye and dye base to dye base, according to the emulsion employed and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly my invention is directed to any emulsion containing a combination of the aforesaid sensitizing dyes and dye bases whereby a supersensitizing effect is obtained.

The following table shows the effects that can be obtained with representatives of my new supersensitizing combinations. These illustrations are not intended to limit my invention.

Table

| | Emulsion | Sensitizing dye (concentration in mg./liter of emulsion) | Dye base (concentration in mg./liter of emulsion) | Percentage speed increase over speed of emulsion containing sensitizing dye alone |
|---|---|---|---|---|
| 1 | Ordinary gelatino-silver-bromide containing small amount of silver iodide (about 40 g. of silver halide per liter of emulsion). | 1,1'-diethyl-2,2'-cyanine iodide 15 mg. | 3 - [(1 - methyl - 1(2)-quinolylidene) methyl]-[2,4-benzothiazine] 10 mg. | 350% in green speed. |
| 2 | ___do___ | ___do___ | (2-ethyl - 2(1)-benzothiazolylidene)-quinaldine 10 mg. | 300% in green speed. |
| 3 | ___do___ | 8-methyl-2,2'-diethyl-3,4,3'4'-dibenzothia-carbo-cyanine iodide 10 mg. | ___do___ | 40% in red speed. |
| 4 | ___do___ | 6'-methyl-2,1'-diethyl-3,4-benzothia-2'-cyanine iodide 15 mg. | 3-[(2-ethyl-2 (1) - benzothiazolylidene) methyl]-[2,4-benzothiazine] 4 mg. | 100% in green speed. |
| 5 | ___do___ | 2-methyl-1'-ethylthia-2'-cyanine iodide 20 mg. | 1-[(-ethyl-2(1)-benzothiazolylidene) methyl]-benzothiazole 10 mg. | 80% in green speed. |
| 6 | ___do___ | 2,2'-diethyloxacarbocyanine iodide 10 mg. | 1-[(2-ethyl-2(1)-benzothiazolylidene) methyl]-benzothiazole 10 mg. | 40% in green speed. |
| 7 | ___do___ | 2,2',8-triethyl-5,6,5',6'-dibenz-oxacarbocyanine. | ___do___ | 150% in green speed. |
| 8 | ___do___ | 8-methyl-2,2'-diethylthia-carbocyanine bromide 10 mg. | [4-methyl-4(3)-(2, 4-benzothiazinylidene)] quinaldine 10 mg. | 30% in minus blue speed. |
| 9 | ___do___ | 4,4'-dichloro-2,2',8-triethyl-thiacarbocyanine iodide 10 mg. | 1-[(2-methyl-2 (1)-benzothiazolylidene)methyl]-benzothiazole 10 mg. | 100% in red speed. |
| 10 | ___do___ | 1,1'-diethyl-2,2'-cyanine iodide 15 mg. | 3-[γ-(2-ethyl-2 (1)-benzoxazolylidene)propenyl]-[2,4-benzothia-zine] 10 mg. | 300% in green speed. |
| 11 | ___do___ | 6'-methyl-2,1'-diethyl-3,4-benzothia-2'-cyanine iodide 15 mg. | ___do___ | 100% in minus blue speed. |
| 12 | ___do___ | 1,1'-diethyl-2,2'-cyanine iodide 15 mg. | 2-[γ-(1-ethyl-1(2)-[β-naphthothiazolylidene]) propenyl]-benzothiazole 10mg | 130% in minus blue speed. |
| 13 | ___do___ | 6'-methyl-2,1'-diethyl-3,4-benzothia-2'-cyanine iodide 15 mg. | 1-[γ-(2-ethyl-2(1)-benzothiazolylidene) propenyl]-[2,4-benzothiazine] 10 mg. | 100% in minus blue speed. |
| 14 | ___do___ | 1,1'-diethyl-2,2'-cyanine iodide 15 mg. | 1-[γ-(2-ethyl-2(1)-benzoselenazolylidene) propenyl] - [2,4 - benzothiazine] 10 mg. | 300% in minus blue speed. |

Green speeds as measured through Wratten No. 58 filter.
Red speeds as measured through Wratten No. 25 filter.
Minus blue speeds as measured through Wratten No. 12 filter.

The accompanying drawing illustrates graphically the supersensitizing effect obtained with four of my new combinations in gelatino-silver-bromide emulsions. Each figure in the drawing is a diagrammatic reproduction of three spectrograms. In each figure, the sensitivity of the emulsion containing only the dye base is represented by a dotted line curve; the sensitivity of the emulsion containing only the sensitizing dye is represented by a dot and dash line curve; and the sensitivity of the emulsion containing the dye base in combination with the sensitizing dye is represented by the solid line curve.

In Fig. 1, curve A represents the sensitivity of an ordinary gelatino-silver-bromide emulsion containing 3 - [(1 - methyl- 1 (2)-quinolylidene) methyl]-[2,4-benzothiazine] in a concentration of 10 mg. per liter of emulsion; curve B represents the sensitivity of the same emulsion containing 1,1'-diethyl-2,2'-cyanine iodide in a concentration of 15 mg. per liter of emulsion; and curve C represents the sensitivity of the same emulsion containing 10 mg. of 3-[(1-methyl-1(2)-quinolylidene)methyl] - [2,4-benzothiazine] and 15 mg. of 1,1'-diethyl-2,2'-cyanine iodide. (See under 1. in the above table.)

In Fig. 2, curve D represents the sensitivity of an ordinary gelatino-silver-bromide emulsion containing (2 - ethyl-2(1)-benzothiazolylidene) - quinaldine in a concentration of 10 mg. per liter of emulsion; curve E represents the sensitivity of the same emulsion containing 8-methyl-2,2'-diethyl-3,4,3'-4'-dibenzothiacarbocyanine iodide in a concentration of 10 mg. per liter of emulsion; curve F represents the sensitivity of the same emulsion containing 10 mg. of (2-ethyl-2(1)-benzothiazolylidene)-quinaldine and 10 mg. of 8-methyl-2,2'-diethyl-3,4,3',4'-dibenzothiacarbocyanine iodide. (See under 3 in the above table.)

In Fig. 3, curve G represents the sensitivity of an ordinary gelatino-silver-bromide emulsion containing 1-[(2-ethyl-2(1)-benzothiazolylidene) methyl] benzothiazole in a concentration of 10 mg. per liter of emulsion. (The sensitivity is the same as that of the emulsion without the dye base, as the dye base confers no extra sensitivity on the emulsion); curve H represents the sensitivity of the same emulsion containing 2,2',8-triethyl-5,6,5',6'-dibenzoxacarbocyanine iodide in a concentration of 10 mg. per liter of emulsion; curve I represents the sensitivity of the same emulsion containing 10 mg. of 1-[(2-ethyl-2(1)-benzothiazolylidene) methyl] benzothiazole and 10 mg. of 2,2',8-triethyl-5,6,5',6'-dibenzoxacarbocyanine. (See under 7 in the above table.)

In Fig. 4, curve J represents the sensitivity of an ordinary gelatino-silver-bromide emulsion containing 3-[ γ - (2-ethyl - 2(1)-benzoxazolylidene) propenyl) ]-[2,4-benzothiazine] in a concentration of 10 mg. per liter of emulsion; curve K represents the sensitivity of the same emulsion containing 6'-methyl-2,1'-diethyl-3,4-benzothia-2'-cyanine iodide in a concentration of 15 mg. per liter of emulsion; curve L represents the sensitivity of the same emulsion containing 10 mg. of 3-[γ-(2-ethyl-2(1)-benzoxazolylidene) propenyl) ]-[2,4-benzothiazine] and 15 mg. of 6'-methyl - 2,1' - diethyl - 3,4-benzothia-2'-cyanine iodide. (See under 11 in the above table.)

The spectograms corresponding to the figures of the accompanying drawing were made in a wedge spectograph. Each horizontal line represents an incident light intensity of about one-tenth that of the line below it.

Simple cyanine dye bases containing a quinoline nucleus can be prepared by heating a cyclammonium quaternary salt containing an alkylmercapto (alkylthio) group in the alpha or gamma position, with quinaldine or lepidine, in the presence of pyridine. Carbocyanine dye bases containing a quinoline nucleus can be prepared by heating a cyclammonium quaternary salt containing an acetanilidovinyl group in the alpha or gamma position with quinaldine or lepidine, in the presence of pyridine. A more satisfactory method of preparing either simple cyanine dye bases or carbocyanine dye bases is the method wherein simple cyanine dyes or carbocyanine dyes are heated with a large amount of diethylaniline. Simple cyanine dye bases and carbocyanine dye bases containing a 2,4-benzothiazine nucleus can also be satisfactorily prepared according to the method set forth in the copending application of Bernard Beilenson, Serial No. 254,256, filed February 2, 1939 (now U. S. Patent 2,179,990, dated November 14, 1939).

What I claim as my invention and desire to be secured by Letters Patent of the United States is:

1. A photographic silver halide emulsion containing a supersensitizing combination selected from the group consisting of a supersensitizing combination of at least one sensitizing dye selected from the group consisting of 2,2'-cyanine dyes and 3,4-benzothia-2'-cyanine dyes together with at least one carbocyanine dye base, and a supersensitizing combination of at least one sensitizing dye selected from the group consisting of 2,2'-cyanine dyes, thia-2'-cyanine dyes, 3,4-benzothia-2'-cyanine dyes, 3,4-benzoxa-2'-cyanine dyes, 2,2'-carbocyanine dyes, oxacarbocyanine dyes, dibenzoxacarbocyanine dyes, 8-alkyldibenzoxacarbocyanine dyes, 8-alkylthiacarbocyanine dyes and 8-alkyldibenzothiacarbocyanine dyes, together with at least one simple cyanine dye base.

2. A photographic gelatino-silver-halide emulsion containing a supersensitizing combination selected from the group consisting of a supersensitizing combination of at least one sensitizing dye selected from the group consisting of 2,2'-cyanine dyes and 3,4-benzothia-2'-cyanine dyes together with at least one carbocyanine dye base, and a supersensitizing combination of at least one sensitizing dye selected from the group consisting of 2,2'-cyanine dyes, thia-2'-cyanine dyes, 3,4-benzothia-2'-cyanine dyes, 3,4-benzoxa-2'-cyanine dyes, 2,2'-carbocyanine dyes, oxacarbocyanine dyes, dibenzoxacarbocyanine dyes, 8-alkyldibenzoxacarbocyanine dyes, 8-alkylthiacarbocyanine dyes and 8-alkyldibenzothiacarbocyanine dyes together with at least one simple cyanine dye base.

3. A photographic gelatino-silver-halide emulsion containing a supersensitizing combination of at least one sensitizing dye selected from the group consisting of 2,2'-cyanine dyes and 3,4-benzothia-2'-cyanine dyes, together with at least one carbocyanine dye base.

4. A photographic gelatino-silver-halide emulsion containing a supersensitizing combination of at least one sensitizing dye selected from the group consisting of 2,2'-cyanine dyes, thia-2'-cyanine dyes, 3,4-benzothia-2'-cyanine dyes and 3,4-benzoxa-2'-cyanine dyes, together with at least one simple cyanine dye base.

5. A photographic gelatino-silver-halide emulsion containing a supersensitizing combination of at least one sensitizing dye selected from the group consisting of 2,2'-carbocyanine dyes, oxacarbocyanine dyes, dibenzoxacarbocyanine dyes, 8-alkyldibenzoxacarbocyanine dyes, 8-alkylthiacarbocyanine dyes and 8-alkylthiadibenzothiacarbocyanine dyes, together with at least one simple cyanine dye base.

6. A photographic gelatino-silver-halide emulsion containing a supersensitizing combination of at least one sensitizing dye selected from the group consisting of 1,1'-dialkyl-2,2'-cyanine dyes and 2,1'-dialkyl-3,4-benzothia-2'-cyanine dyes in which each of the 1-, 1'- and 2-alkyl groups is an alkyl group of the formula $C_nH_{2n+1}$ wherein $n$ represents a positive integer of from one to four, together with at least one carbocyanine dye base selected from the group consisting of 1-[γ-(2-alkyl-2(1)-benzothiazolylidene) propenyl]-benzothiazoles, 1-[γ-(4-alkyl-4(3)-{2,4-benzothiazinylidene})-propenyl]-benzothiazoles, 2-[γ-(4-alkyl-4(3)-{2,4-benzothiazinylidene})-propenyl]-β-naphthothiazoles, 1-[γ-(4-alkyl-4(3)-{2,4-benzothiazinylidene})propenyl]-benzoxazoles, 3-[γ-(2-alkyl-2(1)-{α-naphthoxazolylidene})-propenyl]-[2,4-benzothiazines] and 1-[γ-(2-alkyl-2(1)-benzoselenazolylidene)-propenyl]-[2,4-benzothiazines] in which each of the 2- and 4-alkyl groups is an alkyl group of the formula $C_nH_{2n+1}$ wherein $n$ represents a positive integer of from one to four.

7. A photographic gelatino-silver-halide emulsion containing a supersensitizing combination of at least one sensitizing 1,1'-dialkyl-2,2'-cyanine dye in which each of the 1- and 1'-alkyl groups is an alkyl group of the formula $C_nH_{2n+1}$ wherein $n$ represents a positive integer of from one to four, together with at least one 1-[γ-(4-alkyl-4(3)-{2,4-benzothiazinylidene})-propenyl]-benzoselenazole in which the 4-alkyl group is an alkyl group of the formula $C_nH_{2n+1}$ wherein $n$ represents a positive integer of from one to four.

8. A photographic gelatino-silver-halide emulsion containing a supersensitizing combination of 1,1'-diethyl-2,2'-cyanine iodide, together with 1-[γ-(2-ethyl-2(1)-benzoselenazolylidene)-propenyl]-[2,4-benzothiazine].

9. A photographic gelatino-silver-halide emulsion containing a supersensitizing combination of at least one sensitizing dye selected from the group consisting of 1,1'-dialkyl-2,2'-cyanine dyes, 2,1'-dialkylthia-2'-cyanine dyes, 2,1'-dialkyl-3,4-benzothia-2'-cyanine dyes and 2,1'-dialkyl-3,4-benzoxa-2'-cyanine dyes in which each of the 1-, 1'- and 2-alkyl groups is an alkyl group of the formula $C_nH_{2n+1}$ wherein $n$ represents a positive integer of from one to four, together with at least one simple cyanine dye base selected from the group consisting of [4-alkyl-4(3)-(2,4-benzothiazinylidene)]-quinaldines, (1-alkyl-1(2)-quinolylidene)-quanaldines, 3[(1-alkyl-1(2)-quinolylidene)-methyl]-[2,4-benzothiazines], (2-alkyl-2(1)-benzothiazolylidene)-quinaldines, 2-[(1-alkyl-1(2)-quinolylidene-methyl]-β-naphthothiazoles, 1-[(2-alkyl-2(1)-benzothiazolylidene)-methyl]-benzothiazoles, 1-[(2-alkyl-2(1)-benzothiazolylidene)-methyl]-[2,4-benzothiazines], 3-[(1-alkyl-1(2)-{β-naphthothiazolylidene})-methyl]-[2,4-benzothiazines] and 3-[(4-alkyl-4(3)-{2,4-benzothiazinylidene})-methyl]-[2,4-benzothiazines] in which each of the 1-, 2- and 4-alkyl groups is an alkyl group of the formula $C_nH_{2n+1}$ wherein $n$ represents a positive integer of from one to four.

10. A photographic gelatino-silver-halide emulsion containing a supersensitizing combination of at least one 1,1'-dialkyl-2,2'-cyanine dye in which each of the 1- and 1'-alkyl groups is an alkyl group of the formula $C_nH_{2n+1}$ wherein $n$ represents a positive integer of from one to four, together with at least one 3[(1-alkyl-1(2)-quinolylidene)-methyl]-[2,4-benzothiazine in which the 1-alkyl group is an alkyl group of the formula $C_nH_{2n+1}$ wherein $n$ represents a positive integer of from one to four.

11. A photographic gelatino-silver-halide emulsion containing a supersensitizing combination of 1,1'-diethyl-2,2'-cyanine iodide and 3-[(1-methyl-1(2)-quinolylidene)-methyl]-[2,4-benzothiazine].

12. A photographic gelatino-silver-halide emulsion containing a supersensitizing combination of at least one sensitizing dye selected from the group consisting of 1,1'-dialkyl-2,2'-carbocyanine dyes, 2,2'-dialkyloxacarbocyanine dies, 2,2'-dialkyldibenzoxacarbocyanine dyes, 2,2'-dialkyl-8-alkyldibenzoxacarbocyanine dyes, 2,2'-dialkyl-8-alkylthiacarbocyanine dyes and 2,2'-dialkyl-8-alkyldibenzothiacarbocyanine dyes in which each of the 1-, 1'-, 2- and 2'-alkyl groups is an alkyl group of the formula $C_nH_{2n+1}$ wherein $n$ represents a positive integer of from one to four, and each of the 8-alkyl groups is an alkyl group of the formula $C_nH_{2n+1}$ wherein $n$ represents a positive integer of from one to two, together with at least one simple cyanine dye base selected from the group consisting of [4-alkyl-4(3)-(2,4-benzothiazinylidene)]-quinaldines, (1-alkyl-1(2)-quinolylidene)-quinaldines, 3[(1-alkyl-1(2)-quinolylidene)-methyl]-[2,4-benzothiazines], (2-alkyl-2(1)-benzothiazolylidene)-quinaldines, 2-[(1-alkyl-1(2)-quinolylidene)-methyl]-β-naphthothiazoles, 1-[(2-alkyl-2(1)-benzothiazolylidene)-methyl]-benzothiazoles, 1-[(2-alkyl-2(1)-benzothiazolylidene)-methyl]-[2,4-benzothiazines], 3-[(1-alkyl-1(2)-{β-naphthothiazylidene})-methyl]-[2,4-benzothiazines] and 3-[(4-alkyl-4(3)-{2,4-benzothiazinylidene})-methyl]-[2,4-benzothiazines] in which each of the 1-, 2- and 4-alkyl groups is an alkyl group of the formula $C_nH_{2n+1}$ wherein $n$ represents a positive integer of from one to four.

13. A photographic gelatino-silver-halide emulsion containing a supersensitizing combination of at least one 2,2'-dialkyl-8-alkyl-5,6,5',6'-dibenzoxacarbocyanine dye in which each of the 2- and 2'-alkyl groups is an alkyl group of the formula $C_nH_{2n+1}$ wherein $n$ represents a positive integer of from one to four and in which the 8-alkyl group is an alkyl group of the formula $C_nH_{2n+1}$ wherein $n$ represents a positive integer of from one to two, together with at least one 1-[(2-alkyl-2(1)-benzothiazolylidene)methyl)]-benzothiazole in which the 2-alkyl group is an alkyl group of the formula $C_nH_{2n+1}$ wherein $n$ represents a positive integer of from one to four.

14. A photographic gelatino-silver-halide emulsion containing a supersensitizing combination of 2,2',8-triethyl-5,6,5',6'-dibenzoxacarbocyanine iodide together with 1-[(2-ethyl-2(1)-benzothiazolylidene)methyl)]-benzothiazole.

EDWARD P. DAVEY.